(12) United States Patent
Wu

(10) Patent No.: US 7,153,801 B2
(45) Date of Patent: Dec. 26, 2006

(54) AROMATIZATION CATALYST AND METHODS OF MAKING AND USING SAME

(75) Inventor: An-Hsiang Wu, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 267 days.

(21) Appl. No.: 10/464,195

(22) Filed: Jun. 18, 2003

(65) Prior Publication Data

US 2004/0259719 A1   Dec. 23, 2004

(51) Int. Cl.
*B01J 29/06*   (2006.01)

(52) U.S. Cl. .......................................... 502/66; 502/74

(58) Field of Classification Search ................. 502/60, 502/64, 66, 74, 62
See application file for complete search history.

(56) References Cited

U.S. PATENT DOCUMENTS

| | | | |
|---|---|---|---|
| 4,104,320 A | 8/1978 | Bernard .................... 260/673.5 |
| 4,434,311 A | 2/1984 | Buss .......................... 585/444 |
| 4,435,283 A | 3/1984 | Buss .......................... 208/138 |
| 4,447,316 A | 5/1984 | Buss .......................... 208/138 |
| 4,456,527 A | 6/1984 | Buss ............................ 208/89 |
| 4,458,025 A | 7/1984 | Lee ............................. 502/66 |
| 4,517,306 A | 5/1985 | Buss .......................... 502/74 |
| 4,579,831 A | 4/1986 | Field .......................... 502/66 |
| 4,608,356 A | 8/1986 | Buss .......................... 502/66 |
| 4,645,586 A | 2/1987 | Buss .......................... 208/65 |
| 4,648,961 A | 3/1987 | Jacobson .................... 208/138 |
| 4,761,512 A * | 8/1988 | Katsuno et al. ............. 585/417 |
| 4,830,732 A | 5/1989 | Mohr .......................... 208/138 |
| 4,912,072 A | 3/1990 | Mallouk et al. .............. 502/74 |
| 5,106,803 A | 4/1992 | Mohr ........................... 502/66 |
| 5,182,012 A | 1/1993 | Miller ......................... 208/137 |
| 5,328,595 A | 7/1994 | Rainis ......................... 208/138 |
| 5,354,933 A * | 10/1994 | Ohashi et al. .............. 585/419 |
| 5,401,386 A | 3/1995 | Morrison ..................... 208/65 |
| 5,461,016 A | 10/1995 | Bradley et al. ............... 502/66 |
| 5,879,538 A | 3/1999 | Haritatos .................... 208/137 |
| 6,063,264 A | 5/2000 | Haritatos .................... 208/137 |
| 6,063,724 A | 5/2000 | Resasco et al. .............. 502/73 |
| 6,190,539 B1 | 2/2001 | Holtermann ................ 208/139 |
| 6,207,042 B1 | 3/2001 | Holtermann ................ 208/139 |
| 6,323,381 B1 | 11/2001 | Nacamuli .................... 585/475 |
| 6,406,614 B1 | 6/2002 | Tiedtke et al. .............. 208/138 |
| 6,518,470 B1 | 2/2003 | Fukunaga ................... 585/407 |

OTHER PUBLICATIONS

International Search Report (PCT/US2004/014848), Sep. 27, 2004, 3 pages.

* cited by examiner

*Primary Examiner*—Jonathan Johnson
(74) *Attorney, Agent, or Firm*—Rodney B. Carroll; K. KaRan Reed; David W. Dockter

(57) ABSTRACT

A method of making a catalyst composition, comprising impregnating a large pore zeolite support with a platinum precursor and at least one organic ammonium halide precursor. In an embodiment, the ammonium halide precursor is represented by the formula $N(R)_4X$, where X is a halide and R is a substituted or unsubstituted carbon chain molecule having 1–20 carbon atoms wherein each R may be the same or different. In an embodiment, the ammonium halide precursor comprises at least one acid halide and at least one ammonium hydroxide represented by the formula $N(R')_4OH$, where R' is hydrogen or a substituted or unsubstituted carbon chain molecule having 1–20 carbon atoms wherein each R' may be the same or different. A process for aromatizing a hydrocarbon using said catalyst composition.

81 Claims, No Drawings

AROMATIZATION CATALYST AND METHODS OF MAKING AND USING SAME

FIELD OF THE INVENTION

The present invention relates to an aromatization catalyst and associated methods of making and using same, wherein the catalyst comprises a large pore zeolite support impregnated with a platinum precursor and at least one organic ammonium halide precursor.

BACKGROUND

Large pore zeolite catalysts are useful to dehydrocyclize aliphatic hydrocarbons to produce aromatic hydrocarbons. For example, large pore catalysts are useful for reforming petroleum naphtha (e.g., $C_6$–$C_8$) into benzene, toluene, and xylenes. Examples of such aromatization catalysts include large pore zeolite supports impregnated with a mixture of tetraammineplatinum chloride, ammonium chloride ($NH_4Cl$) and ammonium fluoride ($NH_4F$). Due to the commercial importance of such catalysts, an ongoing need exists from improved aromatization catalysts and methods of making and using same.

SUMMARY OF THE INVENTION

Disclosed herein is a method of making a catalyst composition, comprising impregnating a large pore zeolite support with a platinum precursor and at least one organic ammonium halide precursor. In an embodiment, the ammonium halide precursor is represented by the formula $N(R)_4X$, where X is a halide and R is a substituted or unsubstituted carbon chain molecule having 1–20 carbon atoms wherein each R may be the same or different. In an embodiment, the ammonium halide precursor comprises at least one acid halide and at least one ammonium hydroxide represented by the formula $N(R')_4OH$, where R' is hydrogen or a substituted or unsubstituted carbon chain molecule having 1–20 carbon atoms wherein each R' may be the same or different. In an embodiment the organic ammonium halide precursor comprises (a) a compound represented by the formula $N(R)_4X$, where X is a halide and where R represents a hydrogen or a substituted or unsubstituted carbon chain molecule having 1–20 carbons wherein each R may be the same or different and (b) at least one acid halide and at least one ammonium hydroxide represented by the formula $N(R')_4OH$, where R' is hydrogen or a substituted or unsubstituted carbon chain molecule having 1–20 carbon atoms wherein each R' may be the same or different.

Disclosed herein is a process for aromatizing a hydrocarbon, comprising contacting hydrocarbons with a catalyst under suitable reaction conditions for aromatizing the hydrocarbons, wherein the catalyst is formed by a process comprising impregnating a large pore zeolite support with a platinum precursor and at least one organic ammonium halide precursor.

Other aspects and features of the invention will become apparent from review of the detailed description and the claims.

DETAILED DESCRIPTION OF THE INVENTION

In an embodiment, the organic ammonium halide precursor comprises one or more compounds represented by the formula $N(R)_4X$, where X is a halide and where R represents a hydrogen or a substituted or unsubstituted carbon chain molecule having 1–20 carbons wherein each R may be the same or different. In an embodiment, R is selected from the group consisting of methyl, ethyl, propyl, butyl, and combinations thereof, more specifically methyl. Examples of suitable organic ammonium precursor is represented by the formula $N(R)_4X$ include tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

In an embodiment, the organic ammonium halide precursor comprises at least one acid halide and at least one ammonium hydroxide represented by the formula $N(R')_4OH$, where R' is hydrogen or a substituted or unsubstituted carbon chain molecule having 1–20 carbon atoms wherein each R' may be the same or different. In an embodiment, R' is selected from the group consisting of methyl, ethyl, propyl, butyl, and combinations thereof, more specifically methyl. Examples of suitable ammonium hydroxide represented by the formula $N(R')_4OH$ include ammonium hydroxide, tetraalkylammonium hydroxides such as tetramethylammonium hydroxide, tetraethylammonium hydroxide, tetrapropylammonium hydroxide, tetrabutylammonium hydroxide, and combinations thereof. Examples of suitable acid halides include HCl, HF, HBr, HI, or combinations thereof.

In an embodiment the organic ammonium halide precursor comprises (a) as described previously, a compound represented by the formula $N(R)_4X$, where X is a halide and where R represents a hydrogen or a substituted or unsubstituted carbon chain molecule having 1–20 carbons wherein each R may be the same or different and (b) as described previously, at least one acid halide and at least one ammonium hydroxide represented by the formula $N(R')_4OH$, where R' is hydrogen or a substituted or unsubstituted carbon chain molecule having 1–20 carbon atoms wherein each R' may be the same or different.

The halide precursor may further comprise an ammonium halide such as ammonium chloride, ammonium fluoride, or both in various combinations with the organic ammonium halide precursor compounds described previously. More specifically, ammonium chloride, ammonium fluoride, or both may be used with (a) as described previously, a compound represented by the formula $N(R)_4X$, where X is a halide and where R represents a hydrogen or a substituted or unsubstituted carbon chain molecule having 1–20 carbons wherein each R may be the same or different and/or (b) as described previously, at least one acid halide and at least one organic ammonium hydroxide represented by the formula $N(R')_4OH$, where R' is a substituted or unsubstituted carbon chain molecule having 1–20 carbon atoms wherein each R' may be the same or different. For example, a first fluoride or chloride precursor can be introduced as a tetraalkylammonium halide with a second fluoride or chloride precursor introduced as an ammonium halide. In an embodiment, tetraalkylammonium chloride is used with ammonium fluoride.

Supports for aromatization catalysts can generally include any inorganic oxide. These inorganic oxides include bound large pore aluminosilicates (zeolites), amorphous inorganic oxides and mixtures thereof. Large pore aluminosilicates include, but are not limited to, L-zeolite, Y-zeolite, mordenite and the like. Amorphous inorganic oxides include, but are not limited to, aluminum oxide, silicon oxide and titania. Suitable bonding agents for the inorganic oxides include, but are not limited to, silica, alumina, clays, titania and magnesium oxide.

Zeolite materials, both natural and synthetic, are known to have catalytic properties for many hydrocarbon processes. Zeolites typically are ordered porous crystalline aluminosilicates having structure with cavities and channels interconnected by channels. The cavities and channels throughout the crystalline material generally can be of a size to allow selective separation of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms is equal to 2. The framework exhibits a negative electrovalence which typically is balanced by the inclusion of cations within the crystal such as metals, alkali metals, alkaline earth metals or hydrogen.

L-type zeolite catalysts are a sub-group of zeolitic catalysts. Typical L-type zeolites contain mole ratios of oxides in accordance with the following formula:

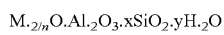

$$M_{2/n}O.Al_2O_3.xSiO_2.yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite.

Bound potassium L-type zeolites, or KL zeolites, have been found to be particularly desirable. The term KL zeolite as used herein refers to L-type zeolites in which the principal cation M incorporated in the zeolite is potassium. As used in this application, a KL zeolite is one that has not been significantly cation-exchanged or impregnated with another metal unless the term KL zeolite is preceded by a modifier such as "platinum-impregnated" or the zeolite explicitly is referred to as a "KL supported Pt zeolite catalyst."

The platinum precursor can be any decomposable platinum compound. Examples of such compounds include, but are not limited to, ammonium tetrachloroplatinate, chloroplatinic acid, diammineplatinum (II) nitrite, bis-(ethylenediamine) platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

In an embodiment, a method for making an aromatization catalyst composition comprises the following steps: (1) predrying large pore zeolite support; (2) treating the zeolite support by impregnating the support with platinum and halide precursors; (3) optionally aging the impregnated support; (4) optionally drying the support; and (5) calcining the support.

Prior to impregnation, the zeolite support typically is dried under flowing or stationary gas selected from the group consisting of hydrogen, oxygen, air, helium, nitrogen, argon, and mixtures thereof. As an example, in some cases the gas can be air, and the drying can be performed from about 1 minute to about 20 hours and at a temperature from about 100° to about 600° C. Impregnation of the halide and platinum precursors into the zeolite support may be performed by any suitable method as known to those skilled in the art, such as insipient wetness.

In some embodiments, it may be desirable to age the impregnated catalyst support. This aging can be performed at temperatures from about subambient to about 200° C., at pressures from about ambient to about 500 psig for periods of time from about 1 minute to about 10 days and under conditions where the impregnated solid is stationary or moving. Ambient conditions are defined as environmental temperature at atmospheric pressure.

In some embodiments, it may be desirable to dry the impregnated catalyst support. The drying generally occurs in the presence of a gas, which can be air, oxygen, nitrogen, hydrogen, or any inert gas, or mixtures thereof. As an example, it may be desirable to dry the impregnated catalyst in the presence of a gas comprising nitrogen and/or oxygen, for example enriched air or diluted air, such that it contains from about 0.1 vol % to about 100 vol % nitrogen, alternatively from about 0.1 vol % to about 60 vol % nitrogen, alternatively from about 0.1 vol % to about 30 vol % nitrogen. In an embodiment, the gas is a mixture of air and nitrogen. This drying can be performed at temperatures from about 0° to about 300° C., alternatively from about 25° to about 250° C., alternatively from about 50 to about 200° C., and at pressures from about 0.01 mmHg to about 500 psig, alternatively from about 0.01 mmHg to about 50 psig, alternatively from about 0.01 mmHg to about 5 psig, alternatively at subambient pressure, also referred to as vacuum drying; for periods of time from about 1 minute to about 20 hours; under conditions where the gas is stationary or moving; and under conditions where the impregnated solid is either stationary or moving. During the drying step, the temperature can be optionally increased from ambient temperature to the desired drying temperature in a controlled manner, preferably through a series of temperature increases followed by temperature hold periods. The drying step may be carried out in any suitable drying equipment, for example a rotary drier.

In some embodiments, it may be desirable to calcine the impregnated catalyst support. The calcination generally occurs in the presence of a gas, which can be air, oxygen, nitrogen, hydrogen, or any inert gas, or mixtures thereof. As an example, it may be desirable to calcine in the presence of a gas comprising nitrogen and/or oxygen, for example enriched air or diluted air, such that it contains from about 0.1 vol % to about 100 vol % oxygen, alternatively from about 1 vol % to about 80 vol % oxygen, alternatively from about 5 vol % to about 60 vol % oxygen. In an embodiment, the gas is a mixture of air and nitrogen, for example having a volume ratio air to nitrogen of from about 1:1 to about 1:3. The calcination step can be performed at temperatures from about 50° to about 600° C., alternatively from about 160° to about 550° C., alternatively from about 275° to about 500° C.; under pressures from ambient to 500 psig; for periods of time from about 1 minute to about 100 hours; under conditions where the gas is stationary or moving; and under conditions were the impregnated catalyst support is stationary or moving. During the calcination step, the temperature is increased from ambient temperature in a controlled manner, preferably through a series of temperature increases followed by temperature hold periods. The calcining step may be carried out in any suitable calcining equipment, for example a rotary calciner or a belt conveyed calciner.

In an embodiment, a KL-zeolite supported platinum aromatization catalyst is prepared by impregnating a KLzeolite-support with tetramethylammonium chloride (TMAC), and/or tetraethylammonium fluoride (TMAF), and tetraammineplatinum chloride (TAPC); and calcining the impregnated zeolite. In an embodiment, a KL-zeolite supported platinum aromatization catalyst is prepared by impregnating a KL-zeolite-support with ammonium fluoride, tetramethylammonium chloride (TMAC), and tetraammineplatinum chloride (TAPC); and calcining the impregnated zeolite.

In another aspect, the invention provides a process for reforming a hydrocarbon, for example aromatization, isomerization, dehydrogenation, and combinations thereof. For example, such a process could include contacting a hydrocarbon stream with a catalyst as described herein under suitable reaction conditions for aromatization of hydrocarbons, for example a temperature in the range of about 800° F. to about 1050° F. In an embodiment, hydrogen is recovered as a product from the reforming process. In an embodiment, the catalyst comprises a composition made according to one of the methods described herein.

In some embodiments, it may be desirable to provide a catalyst having less than about 1.3 wt % chlorine, alternatively less than about 1.0 wt % chlorine, alternatively less than about 0.5 wt % chlorine. In other embodiments, it may be desirable to provide a catalyst having less than about 1.3 wt % fluorine, alternatively less than about 1.0 wt % fluorine, alternatively less than about 0.5 wt % fluorine. Similarly, in other embodiments, it may be desirable to provide a catalyst having less than about 1.0 wt % platinum, alternatively less than about 0.6 wt % platinum, alternatively from about 0.2 to about 0.7 wt % platinum. In various embodiments, the atomic ratio of Pt:F:Cl in the catalyst is from about 1–0.5:3.3–1.7:10–5, respectively. As an example, the amount of fluorine, chlorine, and/or platinum in the catalyst can be controlled by controlling the amount of the respective precursors in the impregnation treatment.

In various embodiments, the catalyst composition comprises less than or equal to about 1 wt % platinum and has a $T_{60}$ temperature of less than about 960° F. and/or a deactivation rate of less than about 2.4° F./day, alternatively a $T_{60}$ temperature of less than about 935° F. and/or a deactivation rate of less than about 1.5° F./day.

In various embodiments, the catalyst composition comprises less than or equal to about 0.5 wt % platinum and has a $T_{60}$ temperature of less than about 1010° F. and/or a deactivation rate of less than about 36° F./day, alternatively a $T_{60}$ temperature of less than about 965° F. and/or a deactivation rate of less than about 3.5° F./day, alternatively a $T_{60}$ temperature of less than about 935° F. and/or a deactivation rate of less than about 1.2° F./day.

In various embodiments, the catalyst composition comprises less than or equal to about 0.3 wt % platinum and has a $T_{60}$ temperature of less than about 972° F. and/or a deactivation rate of less than about 11.4° F./day, alternatively a $T_{60}$ temperature of less than about 950° F. and/or a deactivation rate of less than about 1.5° F./day, alternatively a $T_{60}$ temperature of less than about 935° F. and/or a deactivation rate of less than about 1.2° F./day. The $T_{60}$ temperature is defined as the temperature for a given feedstock at which the sum of the benzene wt % and toluene wt % in the reactor effluent is 60 wt %. Once this conversion rate is achieved at $T_{60}$, the deactivation rate is defined as a degree increase in temperature per day to maintain this conversion rate.

EXAMPLES

In each of the following examples, the prepared catalysts were ground, sieved to 20–40 mesh, and placed in a reactor comprising a metal reactor vessel in a temperature controlled furnace. After reducing the catalyst under flowing hydrogen, a feed stream of aliphatic hydrocarbon and hydrogen was introduced to the reactor vessel at a feed rate of 22 mL/min and a pressure of 50 psig to obtain performance data. The reactor effluent composition was analyzed by gas chromatography to indicate the amount of benzene and toluene.

The catalysts prepared in accordance with Examples 1–11 below illustrate effects of varying the amount of platinum impregnated into the KL-zeolite catalyst when compared to Aromax® II catalyst. Under the present invention, significantly lower $T_{60}$ values and deactivation rates can be obtained by preparing KL supported Pt zeolite catalysts using TMAF in place of $NH_4F$ and using a tetraalkylammonium chloride in place of $NH_4Cl$. The results are summarized in Table 1.

Example 1

A platinum-impregnated KL-zeolite catalyst containing 1.0 wt % platinum is prepared in the following manner. An impregnating mixture of 0.10 g TAPC, 0.45 g TMAF, 0.10 g TMAC and 2.50 g water is formed and added to a container containing 5.0 g of a silica bound KL-zeolite extrudates that has been calcined for 2 hours at 538° C. The mixture is impregnated into the KL-zeolite and then allowed to stand for 20 hours at 95° C. The impregnated KL-zeolite is dried in a vacuum for 2 hours at 170° C. (ramp rate is 0.5° C./min) and then calcined at 300° C. for another 2 hours (ramp rate is 0.25° C./min). The resultant catalyst contains 1.07 wt % Pt, 1.02 wt % Cl and 1.0 wt % F.

Example 2 (Comparison)

A platinum-impregnated KL-zeolite catalyst containing 0.5 wt % platinum is prepared in the following manner. An impregnating mixture of 0.05 g TAPC, 0.10 g $NH_4F$, and 0.05 g $NH_4Cl$ is formed and added to a container containing 5.0 g of a silica bound KL-zeolite predried for 2 hours at 538° C. The mixture is impregnated into the KL-zeolite and then allowed to stand for 20 hours at 95° C. The impregnated KL-zeolite is dried in a vacuum for 2 hours at 170° C. (ramp rate is 0.5° C./min) and then calcined at 300° C. for another 2 hours (ramp rate is 0.25° C./min). The resulting catalyst contains 0.55 wt % Pt, 0.5 wt % Cl and 1.0 wt % F.

Example 3

A platinum-impregnated KL-zeolite catalyst containing 0.5 wt % platinum is prepared in the following manner. An impregnating mixture of 0.05 g TAPC, 0.45 g TMAF, 0.10 g TMAC and 2.50 g water is formed and added to a container containing 5.0 g of a KL-zeolite predried for 2 hours at 538° C. The mixture is impregnated into the KL-zeolite and then allowed to stand for 20 hours at 95° C. The impregnated KL-zeolite is dried in a vacuum for 2 hours at 170° C. (ramp rate is 0.5° C./min) and then calcined at 300° C. for another 2 hours (ramp rate is 0.25° C./min). The resulting catalyst contains 0.54 wt % Pt, 0.83 wt % Cl and 1.0 wt % F.

Example 4 (Comparison)

A platinum-impregnated KL-zeolite catalyst containing 0.3 wt % platinum is prepared in the following manner. An impregnating mixture of 0.10 g TAPC, 0.40 g $NH_4F$, and 0.8 g $NH_4Cl$ (0.8% aqueous solution) is formed and added to a container containing 5.0 g of a KL-zeolite predried for 2 hours at 250° C. The mixture is impregnated into the KL-zeolite and then allowed to stand for 20 hours ambient temperature. The impregnated KL-zeolite is dried in a vacuum for four hours at 170° C. and then calcined at 350° C. for 2 hours. The resulting catalyst contains 0.30 wt % Pt, 0.34 wt % Cl and 1.1 wt % F.

Example 5

A platinum-impregnated KL-zeolite catalyst containing 0.3 wt % platinum is prepared in the following manner. An impregnating mixture of 0.10 g TAPC, 0.40 g $NH_4F$, and 0.14 g TMAC is formed and added to a container containing 18.23 g of a KL-zeolite predried for 2 hours at 250° C. The mixture is impregnated into the KL-zeolite and then allowed to stand for 20 hours ambient temperature. The impregnated KL-zeolite is dried in a vacuum for four hours at 170° C. and then calcined at 350° C. for 2 hours. The resulting catalyst contains 0.30 wt % Pt, 0.32 wt % Cl and 1.12 wt % F.

Example 6

A platinum-impregnated KL-zeolite catalyst containing 0.3 wt % platinum is prepared in the following manner. An impregnating mixture of 0.10 g TAPC, 1.78 g TMAF, 0.10 g TMAC and 6.90 g water is formed and added to a container containing 18.23 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for 2 hours. The resulting catalyst contains 0.30 wt % Pt, 0.30 wt % Cl and 1.12 wt % F.

Example 7

A platinum-impregnated KL-zeolite catalyst containing 0.3 wt % platinum is prepared in the following manner. An impregnating mixture of 0.10 g TAPC, 1.84 g TMAF, and 7 g $NH_4Cl$ is formed and added to a container containing 18.23 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for 2 hours. The resulting catalyst contains 0.30 wt % Pt, 0.31 wt % Cl and 1.15 wt % F.

Example 8

A platinum-impregnated KL-zeolite catalyst containing 0.29 wt % platinum is prepared in the following manner. An impregnating mixture of 0.1 g TAPC, 1.60 g TMAF and 0.11 g TMAC is formed and added to a container containing 18.22 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for 2 hours. The resulting catalyst contains 0.29 wt % Pt, 0.30 wt % Cl and 1.00 wt % F.

Example 9

A platinum-impregnated KL-zeolite catalyst containing 0.3 wt % platinum is prepared in the following manner. An impregnating mixture of 0.10 g TAPC, 2.05 g TMAF and 0.10 g TMAC is formed and added to a container containing 18.25 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for 2 hours. The resulting catalyst contains 0.30 wt % Pt, 0.30 wt % Cl and 1.28 wt % F.

Example 10

A platinum-impregnated KL-zeolite catalyst containing 0.3 wt % platinum is prepared in the following manner. An impregnating mixture of 0.10 g TAPC, 1.75 g TMAF, 0.18 g tetraethylammonium chloride (TEAC) and 6.50 g water is formed and added to a container containing 18.24 g of a KL-zeolite predried for 2 hours at 250° C. The mixture is impregnated into the KL-zeolite and then allowed to stand for 16 hours at ambient temperature. The impregnated KL-zeolite is dried in a vacuum for 2 hours at 170° C. and then calcined at 350° C. for 2 hours. The resulting catalyst contains 0.30 wt % Pt, 0.32 wt % Cl and 1.09 wt % F.

Example 11

A platinum-impregnated KL-zeolite catalyst containing 0.3 wt % platinum is prepared in the following manner. An impregnating mixture of 0.10 g TAPC, 1.75 g TMAF, 0.30 g tetrabutylammonium chloride (TBAC) and 6.50 g water is formed and added to a container containing 18.29 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for 2 hours. The resulting catalyst contains 0.30 wt % Pt, 0.32 wt % Cl and 1.09 wt % F.

TABLE 1

| Example | Pt (wt %) | Pt Source | Fluorine Precursor | Chlorine Precursor | Initial $T_{60}$* | Deactivation Rate (° F./day) |
| --- | --- | --- | --- | --- | --- | --- |
| Aromax II (comparison) | 1.0% | TAPC | $NH_4F$ | $NH_4Cl$ | 935 | 1.416 |
| 1 | 1.0% | TAPC | TMAF | TMAC | 911 | 1.486 |
| 2 (comparison) | 0.5% | TAPC | $NH_4F$ | $NH_4Cl$ | 981 | 36.211 |
| 3 | 0.5% | TAPC | TMAF | TMAC | 933 | 3.441 |
| 4 | 0.3% | TAPC | $NH_4F$ | $NH_4Cl$ | 961 | 11.416 |

TABLE 1-continued

| Example | Pt (wt %) | Pt Source | Fluorine Precursor | Chlorine Precursor | Initial $T_{60}$* | Deactivation Rate (° F./day) |
|---|---|---|---|---|---|---|
| (comparison) | | | | | | |
| 5 | 0.3% | TAPC | $NH_4F$ | TMAC | 979 | 8.99 |
| 6 | 0.3% | TAPC | TMAF | TMAC | 933 | 1.28 |
| 7 | 0.3% | TAPC | TMAF | $NH_4Cl$ | 937 | 5.07 |
| 8 | 0.29% | TAPC | TMAF | TMAC | 940 | 7.28 |
| 9 | 0.3% | TAPC | TMAF | TMAC | 951 | 16.79 |
| 10 | 0.3% | TAPC | TMAF | TEAC | 945 | 6.85 |
| 11 | 0.3% | TAPC | TMAF | TBAC | 933 | 0.67 |

*Temperature (° F.) at which the sum of the benzene wt % and toluene wt % in the reactor effluent is 60 wt %.

The results in Table 1 demonstrate that the substitution of TMAF and TMAC for $NH_4F$ and $NH_4Cl$, respectively, significantly decreases the deactivation rate and/or the $T_{60}$ value. Example 1 used an impregnation comprising TAPC, TMAC and TMAF and produced a 1.0 wt % Pt. When compared to the Aromax® II catalyst, there was a 24° F. reduction in the $T_{60}$ value. By reducing the amount of platinum from 1.0 wt % to 0.5 wt %, as shown in the comparison of Examples 2 and 3, the catalyst made using TAPC, $NH_4F$ and $NH_4Cl$ (Example 2) had a 75° F. increase in the $T_{60}$ value and a significant increase in the deactivation rate when compared to the Aromax® II catalyst which contained 1 wt % platinum.

While the catalyst containing 0.5 wt % platinum made by using TAPC, TMAF and TMAC (Example 3) did not show improvement over the Aromax® II catalyst with respect to the $T_{60}$ value or the deactivation rate, the catalyst was a significant improvement over Example 2 which is an Aromax® II type catalyst, but containing 0.5 wt % platinum.

Examples 4 and 6 show the differences between Aromax® II catalyst and an Aromax® II type catalyst containing 0.3 wt % platinum and a catalyst prepared using TAPC, TMAF and TMAC containing 0.3 wt % platinum. The Aromax®) II type catalyst (Example 4) showed a significant increase in the $T_{60}$ value and in the deactivation rate when compared to the Aromax® II catalyst (comparison) and a platinum-impregnated KL-zeolite catalyst of the invention made in accordance with Example 6.

Example 4 and 5 show the differences between an Aromax® II type catalyst containing 0.3 wt % platinum and a catalyst prepared using TAPC, $NH_4F$, and TMAC containing 0.3 wt % platinum. The Aromax® II type catalyst (Example 4) showed a significant increase in the deactivation rate when compared to the platinum-impregnated KL-zeolite catalyst of the invention made in accordance with Example 5.

Examples 7–11 show improved $T_{60}$ values and lower deactivation rates than comparative Example 4 when TMAF was substituted for $NH_4F$. Examples 8 and 9 show the effects of fluorine and chlorine loading, as shown in more detail below.

Examples 3, 12, 13, and 14 in Table 2 illustrate effects on $T_{60}$ value and the deactivation rate when the amount of chlorine in the catalyst is varied. Examples 12, 13, and 14 were prepared as follows:

Example 12

A platinum KL-zeolite containing 0.5 wt % platinum is prepared in the following manner. An impregnating mixture of 0.05 g TAPC, 0.45 g TMAF, 0.02 g TMAC and 2.0 g water is formed and added to a container containing 5.0 g of a KL-zeolite predried for 2 hours at 538° C. The mixture is impregnated into the KL-zeolite and then allowed to stand for 20 hours at ambient temperature. The impregnated KL-zeolite is dried in a vacuum for 2 hours at 170° C. and then calcined at 300° C. for another 2 hours.

Example 13

A platinum KL-zeolite containing 0.5 wt % platinum is prepared in the following manner. An impregnating mixture of 0.05 g TAPC, 0.45 g TMAF, 0.05 g TMAC and 2.0 g water is formed and added to a container containing 5.0 g of a KL-zeolite predried for 2 hours at 538° C. The mixture is impregnated into the KL-zeolite and then allowed to stand for 20 hours at ambient temperature. The impregnated KL-zeolite is dried in a vacuum for 2 hours at 170° C. and then calcined at 300° C. for another 2 hours.

Example 14

A platinum KL-zeolite containing 0.5 wt % platinum is prepared in the following manner. An impregnating mixture of 0.05 g TAPC, 0.45 g TMAF, and 2.0 g water is formed and added to a container containing 5.0 g of a KL-zeolite predried for 2 hours at 538° C. The mixture is impregnated into the KL-zeolite and then allowed to stand for 20 hours at ambient temperature. The impregnated KL-zeolite is dried in a vacuum for 2 hours at 170° C. and then calcined at 300° C. for another 2 hours.

TABLE 2

| Example | Platinum wt % | Fluorine wt % | Chlorine wt % | Initial $T_{60}$* | Deactivation Rate (° F./day) |
|---|---|---|---|---|---|
| 12 | 0.5 | 1.0 | 0.3 | 908 | 1.442 |
| 13 | 0.5 | 1.0 | 0.5 | 930 | 3.608 |
| 14 | 0.5 | 1.0 | 0.2 | 933 | −0.456 |
| 3 | 0.5 | 1.0 | 0.8 | 933 | 3.441 |
| 2 | 0.5 | 1.0 ($NH_4F$) | 0.5 ($NH_4Cl$) | 981 | 36.211 |

*Temperature (° F.) at which the sum of the benzene wt % and toluene wt % in the reactor effluent is 60 wt %.

Table 2 is a comparison of changes in the chlorine content of catalyst prepared using TAPC, TMAF and TMAC. The results demonstrate a progressively lower deactivation rate and $T_{60}$ value as chlorine levels are reduced. Example 2 demonstrates that a poor $T_{60}$ value and deactivation rate are obtained when the impregnate comprises $NH_4F$ and $NH_4Cl$ instead of TMAF and TMAC.

Examples 15–23 (in addition to Examples 6–11) set forth procedures for preparing KL supported Pt zeolite aromatization catalysts containing about 0.3 wt % platinum. The catalysts produced have varying amounts of fluorine and chlorine.

Example 15

A platinum KL-zeolite containing 0.3 wt % platinum is prepared in the following manner. An impregnating mixture of 0.05 g TAPC, 0.08 g TMAF and 4.5 g water is formed and added to a container containing 9.26 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 16

A platinum KL-zeolite containing 0.3 wt % platinum is prepared in the following manner. An impregnating mixture of 0.16 g TAPC, 2.55 g TMAF, 8.0 g TMAC and 7.0 g water is formed and added to a container containing 29.50 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 17

A platinum KL-zeolite containing 0.3 wt % platinum is prepared in the following manner. An impregnating mixture of 0.10 g TAPC, 1.28 g TMAF, 0.07 g TMAC and 7.0 g water is formed and added to a container containing 18.26 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 18

A platinum KL-zeolite containing 0.3 wt % platinum is prepared in the following manner. An impregnating mixture of 0.10 g TAPC, 1.60 g TMAF, 0.07 g TMAC and 7.0 g water is formed and added to a container containing 18.24 g of a KL-zeolite predried for 2 hours at 250° C. The mixture is impregnated into the KL-zeolite and then allowed to stand for 68 hours at ambient temperature. The impregnated KL-zeolite is dried in a vacuum for 2 hours at 170° C. and then calcined at 350° C. for another 2 hours.

Example 19

A platinum KL-zeolite containing 0.3 wt % platinum is prepared in the following manner. An impregnating mixture of 0.05 g TAPC, 0.80 g TMAF, 0.049 g TMAC and 4.5 g water is formed and added to a container containing 9.26 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 20

A platinum KL-zeolite containing 0.3 wt % platinum is prepared in the following manner. An impregnating mixture of 0.10 g TAPC, 1.78 g TMAF, 0.07 g TMAC and 7.0 g water is formed and added to a container containing 18.23 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 21

A platinum KL-zeolite containing 0.3 wt % platinum is prepared in the following manner. An impregnating mixture of 0.10 g TAPC, 1.92 g TMAF, 0.07 g TMAC and 7.0 g water is formed and added to a container containing 18.24 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 22

A platinum KL-zeolite containing 0.3 wt % platinum is prepared in the following manner. An impregnating mixture of 0.50 g TAPC, 0.82 g TMAF, 0.06 g TMAC and 4.0 g water is formed and added to a container containing 9.11 g of a KL-zeolite predried for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

Example 23

A platinum KL-zeolite containing 0.3 wt % platinum is prepared in the following manner. An impregnating mixture of 0.05 g TAPC, 0.82 g TMAF, 0.10 g TMAC and 4.0 g water is formed and added to a container containing 9.11 g of a KL-zeolite that has been baked for 2 hours at 250° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

The $T_{60}$ and deactivation rate data for the catalysts prepared in accordance with Examples 15–23 as well as Examples 6–11 are summarized in Table 3.

TABLE 3

| Example | Platinum wt % | Fluorine wt % | Chlorine wt % | Initial $T_{60}$* | Deactivation Rate (° F./day) |
|---|---|---|---|---|---|
| 15 | 0.30 | 1.00 | 0.11 | 980 | 0.51 |
| 16 | 0.30 | 1.00 | 0.18 | 929 | 0.76 |
| 17 | 0.30 | 0.80 | 0.23 | 928 | 0.79 |
| 18 | 0.30 | 1.00 | 0.23 | 949 | 0.37 |
| 19 | 0.30 | 0.99 | 0.23 | 943 | 0.18 |
| 20 | 0.30 | 1.12 | 0.23 | 948 | 1.29 |
| 21 | 0.30 | 1.21 | 0.23 | 934 | 0.03 |
| 22 | 0.30 | 1.02 | 0.32 | 930 | −0.006 |
| 6 | 0.30 | 1.12 | 0.30 | 933 | −0.59 |
| 7 | 0.30 | 1.15 | 0.31 | 937 | 5.07 |
| 8 | 0.29 | 1.00 | 0.30 | 940 | 7.28 |
| 9 | 0.30 | 1.28 | 0.30 | 951 | 16.79 |
| 10 | 0.30 | 1.09 | 0.32 | 945 | 6.85 |
| 11 | 0.30 | 1.09 | 0.32 | 933 | 0.67 |
| 23 | 0.31 | 1.04 | 0.49 | 946 | 0.44 |

*Temperature (° F.) at which the sum of the benzene wt % and toluene wt % in the reactor effluent is 60 wt %.

The results of Table 3 show that satisfactory $T_{60}$ values and low deactivation rates can be obtained from a low-platinum load catalyst formed by using the TAPC, TMAF and TMAC impregnate (Examples 16–23) to prepare the catalyst on a KL-zeolite support. The results show further that when TMAF is used in place of NH$_4$F, the catalyst has lower T$_{60}$ values and lower deactivation rates than catalysts containing 0.3 wt. % and 0.5 wt. % platinum prepared using an impregnate containing TAPC, NH$_4$F and NH$_4$Cl. See comparative Examples 2 and 4 in Table 1.

Table 4 is a comparison of changes in the fluorine impregnating agent used to prepare the catalyst.

Example 24

A platinum KL-zeolite containing 1.0 wt % platinum is prepared in the following manner. An impregnating mixture of 0.20 g TAPC and 4.5 g water is formed and added to a container containing 10.0 g of a KL-zeolite predried for 2 hours at 538° C. The mixture is impregnated into the KL-zeolite and then allowed to stand for 16 hours at 75° C. and then 2 hours at 170° C. The impregnated KL-zeolite is dried in a vacuum for 2 hours at 170° C. and then calcined at 300° C. for another 2 hours.

Example 25

A platinum KL-zeolite containing 1.0 wt % platinum is prepared in the following manner. An impregnating mixture of 0.20 g TAPC, 0.10 g ammonium chloride and 4.8 g water is formed and added to a container containing 10.0 g of a KL-zeolite predried for 2 hours at 538° C. The mixture is impregnated into the KL-zeolite and then allowed to stand for 10 hours at 95° C. The impregnated KL-zeolite is dried in a vacuum for 2 hours at 160° C. and then calcined at 300° C. for another 2 hours.

Example 26

A platinum KL-zeolite containing 1.0 wt % platinum is prepared in the following manner. An impregnating mixture of 0.20 g TAPC, 0.20 g TMAC and 4.8 g water is formed and added to a container containing 10.0 g of a KL-zeolite predried for 2 hours at 538° C. The mixture is impregnated into the KL-zeolite and then allowed to stand for 16 hours at 95° C., and then 2 hours at 160° C. The impregnated KL-zeolite is dried in a vacuum for 2 hours at 170° C. and then calcined at 300° C. for another 2 hours.

Example 27

A platinum KL-zeolite containing 1.0 wt % platinum is prepared in the following manner. An impregnating mixture of 0.20 g TAPC, 0.15 g ammonium chloride, 0.2 g ammonium fluoride and 4.5 g water is formed and added to a container containing 10.0 g of a KL-zeolite predried for 2 hours at 538° C. The mixture is impregnated into the KL-zeolite and then allowed to stand for 16 hours at 70° C. The impregnated KL-zeolite is dried in a vacuum for 2 hours at 170° C. and then calcined at 300° C. for another 2 hours.

Example 28

A platinum KL-zeolite containing 1.0 wt % platinum is prepared in the following manner. An impregnating mixture of 0.10 g TAPC, 0.1 g ammonium fluoride, 0.10 g TMAC and 2.4 g water is formed and added to a container containing 5.0 g of a KL-zeolite predried for 2 hours at 538° C. The mixture is impregnated into the KL-zeolite and then allowed to stand for 20 hours at ambient temperature. The impregnated KL-zeolite is dried in a vacuum for 2 hours at 170° C. and then calcined at 350° C. for another 2 hours.

The T$_{60}$ and deactivation rate data for the catalysts prepared in accordance with Examples 24–28 is summarized in Table 4.

TABLE 4

| Example | Pt (wt %) | Pt Source | Fluorine Precursor | Chlorine Precursor | Initial T$_{60}$* | Deactivation Rate (° F./day) |
|---|---|---|---|---|---|---|
| 24 | 1.0 | TAPC | None | None | 930 | 14.86 |
| 25 | 1.0 | TAPC | None | NH$_4$Cl | 965 | 26.697 |
| 26 | 1.0 | TAPC | None | TMAC | 933 | 38.444 |
| 27 | 1.0 | TAPC | NH$_4$F | NH$_4$Cl | 935 | 2.472 |
| 28 | 1.0 | TAPC | NH$_4$F | TMAC | 920 | 0.250 |

*Temperature (° F.) at which the sum of the benzene wt % and toluene wt % in the reactor effluent is 60 wt %.

The results of Table 4 show that satisfactory T$_{60}$ values and low deactivation rates can be obtained by using a TAPC, TMAC and ammonium fluoride impregnate to prepare the catalyst on a KL-zeolite support (Example 28). Conversely, where no flourine impregnate was used (Examples 24–26), or where ammonium fluoride was used in conjunction with ammonium chloride (Example 27), the resulting T$_{60}$ and deactivation rates were undesirably higher.

In addition to the methods described in the Examples above, the catalysts of the present invention can be prepared by impregnating a suitable catalytic substrate with TAPC with hydrogen fluoride (HF), hydrogen chloride (HCl) and an organic or inorganic hydroxide represented by the formula N(R)$_4$OH, where R represents hydrogen or a substituted or unsubstituted carbon chain molecule having 1–20 carbon atoms.

Example 29

A platinum KL-zeolite containing 0.5 wt % platinum is prepared in the following manner. An impregnating mixture of 0.10 g TAPC, 1.50 g HF, 0.64 g HCl, 0.83 g ammonium hydroxide and 2.0 g water is formed and added to a container containing 10.97 g of a KL-zeolite predried for 2 hours at 250° C. The mixture is impregnated into the KL-zeolite and then allowed to stand for 16 hours at ambient temperature. The impregnated KL-zeolite is dried in a vacuum for 2 hours at 170° C. and then calcined at 350° C. for another 2 hours.

Example 30

A platinum KL-zeolite containing 0.5 wt % platinum is prepared in the following manner. An impregnating mixture of 0.10 g TAPC, 1.50 g HF, 0.64 g HCl, 2.45 g tetramethylammonium hydroxide and 0.50 g water is formed and added to a container containing 10.96 g of a KL-zeolite predried for 2 hours at 250° C. The mixture is impregnated into the KL-zeolite and then allowed to stand for 16 hours at ambient temperature. The impregnated KL-zeolite is dried in a vacuum for 2 hours at 170° C. and then calcined at 350° C. for another 2 hours.

Example 31

A platinum KL-zeolite containing 0.5 wt % platinum is prepared in the following manner. An impregnating mixture of 0.10 g TAPC, 1.50 g HF, 0.64 g HCl and 2.8 g tetraethylammonium hydroxide is formed and added to a container containing 10.96 g of a KL-zeolite predried for 2 hours at 250° C. The mixture is impregnated into the KL-zeolite and then allowed to stand for 16 hours at ambient temperature. The impregnated KL-zeolite is dried in a vacuum for 2 hours at 170° C. and then calcined at 350° C. for another 2 hours.

Example 32

A platinum KL-zeolite containing 0.5 wt % platinum is prepared in the following manner. An impregnating mixture of 0.10 g TAPC, 1.50 g HF, 0.64 g HCl and 6.8 g tetrapropylammonium hydroxide is formed and added to a container containing 10.93 g of a KL-zeolite predried for 2 hours at 250° C. The mixture is impregnated into the KL-zeolite and then allowed to stand for 16 hours at ambient temperature. The impregnated KL-zeolite is dried in a vacuum for 2 hours at 170° C. and then calcined at 350° C. for another 2 hours.

The results of Examples 29–32 are summarized in Table 5. This table shows that low loading catalysts containing 0.5 wt % platinum, 1.03 wt % fluorine and 0.39 wt % chlorine prepared using TAPC, HF, HCl and ammonium hydroxide or a tetraalkylammonium hydroxide result in low fouling rates.

TABLE 5

| Example | Platinum wt % | Fluorine wt % | Chlorine wt % | Ammonium Compound | Initial $T_{60}$* | Deactivation Rate (° F./day) |
|---|---|---|---|---|---|---|
| 29 | 0.50 | 1.03 | 0.39 | $NH_4OH$ | 963 | 0.331 |
| 30 | 0.50 | 1.03 | 0.39 | $(CH_3)_4NOH$ | 917 | 0.095 |
| 31 | 0.50 | 1.03 | 0.39 | $(C_2H_5)_4NOH$ | 931 | 0.131 |
| 32 | 0.50 | 1.03 | 0.39 | $(C_3H_7)_4NOH$ | 918 | −0.174 |

*Temperature (° F.) at which the sum of the benzene wt % and toluene wt % in the reactor effluent is 60 wt %.

While the foregoing discussion is intended to provide a detailed illustration of certain embodiments of the invention, it will be appreciated that additional embodiments are also possible under the claims provided herein. It will also be appreciated that numerical values and ranges are presented in approximate form such that small or inconsequential deviations from such values are intended to be within the scope of the values and ranges presented.

The following is claimed:

1. A method of making a catalyst composition, comprising:
   impregnating a large pore zeolite support with a platinum precursor and at least one organic ammonium fluoride precursor represented by the formula $N(R)_4F$ and at least one organic ammonium chloride precursor represented by the formula $N(R)_4Cl$, where R is a substituted or unsubstituted carbon chain having 1–20 carbon atoms and each R may be the same or different.

2. The method of claim 1 wherein the large pore zeolite is an L-type zeolite.

3. The method of claim 1 wherein the large pore zeolite is a potassium L-type zeolite.

4. The method of claim 1 wherein R is an alkyl.

5. The method of claim 1 wherein R is selected from the group consisting of methyl, ethyl, propyl, butyl, and combinations thereof.

6. The method of claim 1 wherein the fluoride precursor is tetramethylammonium fluoride.

7. The method of claim 6 wherein the chloride precursor is tetramethylammonium chloride.

8. A method of making a catalyst composition, comprising:
   impregnating a large pore zeolite support with a platinum precursor and at least one organic ammonium halide precursor, wherein the ammonium halide precursor is represented by the formula $N(R)_4X$, where X is a halide, R is a substituted or unsubstituted carbon chain molecule having 1–20 carbon atoms, and each R may be the same or different, and wherein the halide precursor further comprises ammonium chloride.

9. The method of claim 6 wherein the chloride precursor further comprises ammonium chloride.

10. The method of claim 7 wherein the chloride precursor further comprises ammonium chloride.

11. A method of making a catalyst composition, comprising:
   impregnating a large pore zeolite support wit a platinum precursor and at least one organic ammonium halide precursor, wherein the ammonium halide precursor is represented by the formula $N(R)_4X$, where X is a halide, R is a substituted or unsubstituted carbon chain molecule having 1–20 carbon atoms, and each R may be the same or different, and wherein the halide precursor further comprises ammonium fluoride.

12. The method of claim 6 wherein the fluoride precursor further comprises ammonium fluoride.

13. The method of claim 7 wherein the fluoride precursor further comprises ammonium fluoride.

14. The method of claim 8 wherein the halide precursor further comprises ammonium fluoride.

15. The method of claim 9 wherein the fluoride precursor further comprises ammonium fluoride.

16. The method of claim 10 wherein the fluoride precursor further comprises ammonium fluoride.

17. The method of claim 1, wherein the platinum precursor is selected from the group consisting of ammonium tetrachloroplatinate, chloroplatinic acid, diammineplatinum (II) nitrite, bis (ethylenediamine)platinum (II) chloride, platinum (II) acetylacetonate, dichlorodiammine platinum, platinum (II) chloride, tetraammineplatinum (II) hydroxide, tetraammineplatinum (II) nitrate, and combinations thereof.

18. The method of claim 1 wherein the platinum precursor is tetraammineplatinum chloride.

19. The method of claim 6 wherein the platinum precursor is tetraammineplatinum chloride.

20. The method of claim 7 wherein the platinum precursor is tetraammineplatinum chloride.

21. The method of claim 8 wherein the platinum precursor is tetraammineplatinum chloride.

22. The method of claim 9 wherein the platinum precursor is tetraammineplatinum chloride.

23. The method of claim 10 wherein the platinum precursor is tetraammineplatinum chloride.

24. The method of claim 11 wherein the platinum precursor is tetraammineplatinum chloride.

25. The method of claim 12 wherein the platinum precursor is tetraammineplatinum chloride.

26. The method of claim 13 wherein the platinum precursor is tetraammineplatinum chloride.

27. The method of claim 14 wherein the platinum precursor is tetraammineplatinum chloride.

28. The method of claim 15 wherein the platinum precursor is tetraammineplatinum chloride.

29. The method of claim 16 wherein the platinum precursor is tetraammineplatinum chloride.

30. A method of making a catalyst composition, comprising:
impregnating a large pore zeolite support with a platinum precursor and at least one organic ammonium halide precursor, wherein the ammonium halide precursor comprises at least one acid halide and at least one ammonium hydroxide represented by the formula N(R')$_4$OH, where R' is hydrogen or a substituted or unsubstituted carbon chain molecule having 1–20 carbon atoms wherein each R' may be the same or different.

31. The method of claim 30 wherein the large pore zeolite is an L-type zeolite.

32. The method of claim 30 wherein the large pore zeolite is a potassium L-type zeolite.

33. The method of claim 30 wherein R' is an alkyl.

34. The method of claim 30 wherein R' is selected from the group consisting of methyl, ethyl, propyl, butyl, and combinations thereof.

35. The method of claim 30 wherein R' is methyl.

36. The method of claim 30 wherein the acid halide is HCl, HF, HBr, HI, or combinations thereof.

37. The method of claim 34 wherein the acid halide is HCl, HF, or both.

38. The method of claim 35 wherein the acid halide is HCl.

39. The method of claim 35 wherein the acid halide is HF.

40. The method of claim 30 wherein the halide precursor further comprises ammonium chloride, ammonium fluoride, or both.

41. The method of claim 37 wherein the halide precursor further comprises ammonium chloride, ammonium fluoride, or both.

42. The method of claim 31 wherein the platinum precursor is selected from the group consisting of ammonium tetrachloroplatinate, chloroplatinic acid, diammineplatinum (II) nitrite, bis (ethylenediamine)platinum (II) chloride, platinum (II) acetylacetonate, dichlorodiammine platinum, platinum (II) chloride, tetraammineplatinum (II) hydroxide, tetraammineplatinum (II) nitrate, and combinations thereof.

43. The method of claim 30 wherein the platinum precursor is tetraammineplatinum chloride.

44. The method of claim 36 wherein the platinum precursor is tetraammineplatinum chloride.

45. The method of claim 37 wherein the platinum precursor is tetraammineplatinum chloride.

46. The method of claim 38 wherein the platinum precursor is tetraammineplatinum chloride.

47. The method of claim 39 wherein the platinum precursor is tetraammineplatinum chloride.

48. The method of claim 41 wherein the platinum precursor is tetraammineplatinum chloride.

49. A method of making a catalyst composition, comprising:
impregnating a large pore zeolite support with a platinum precursor and at least one organic ammonium halide precursor, wherein the ammonium halide precursor is represented by the formula N(R)$_4$X, where X is a halide, R is a substituted or unsubstituted carbon chain molecule having 1–20 carbon atoms, and each R maybe the same or different, and wherein the ammonium halide precursor further comprises at least one acid halide and at least one ammonium hydroxide represented by the formula N(R')$_4$OH, where R' is hydrogen or a substituted or unsubstituted carbon chain molecule having 1–20 carbon atoms wherein each R' may be the same or different.

50. The method of claim 49 wherein the large pore zeolite is a potassium L-type zeolite.

51. The method of claim 49 wherein each R and R' are selected from the group consisting of methyl, ethyl, propyl, butyl, and combinations thereof.

52. The method of claim 49 wherein X is selected from the group consisting of F, Cl, Br, I, and combinations thereof.

53. The method of claim 49 wherein the acid halide is HCl, HF, or both.

54. The method of claim 49 wherein the halide precursor further comprises ammonium chloride, ammonium fluoride, or both.

55. The method of claim 49 wherein the platinum precursor is selected from the group consisting or ammonium tetrachloroplatinate, chloroplatinic acid, diammineplatinum (II) nitrite, bis (ethylenediamine)platinum (II) chloride, platinum (II) acetylacetonate, dichlorodiammine platinum, platinum (II) chloride, tetraammineplatinum (II) hydroxide, tetraammineplatinum chloride, tetraammineplatinum (II) nitrate, and combinations thereof.

56. The method of claim 1, wherein the catalyst comprises less than about 1.3 wt % chlorine.

57. The method of claim 30, wherein the catalyst comprises less than about 1.3 wt % chlorine.

58. The method of claim 1, wherein the catalyst comprises less than about 1.3 wt % fluorine.

59. The method of claim 30, wherein the catalyst comprises less than about 1.3 wt % fluorine.

60. The method of claim 1, wherein the catalyst comprises less than about 1.3 wt % chlorine and less than about 1.3 wt % fluorine.

61. The method of claim 30, wherein the catalyst comprises less than about 1.3 wt % chlorine and less than about 1.3 wt % fluorine.

62. The method of claim 1, wherein the catalyst comprises platinum in the range of about 0.2 wt % to about 0.7 wt %.

63. The method of claim 30, wherein the catalyst comprises platinum in the range of about 0.2 wt % to about 0.7 wt %.

64. The method of claim 1, wherein the catalyst comprises less than about 0.6 wt % platinum, less than about 1.3 wt % chlorine, and less than about 1.3 wt % fluorine.

65. The method of claim 30, wherein the catalyst comprises less than about 0.6 wt % platinum, less than about 1.3 wt % chlorine, and less than about 1.3 wt % fluorine.

66. The process of claim 1 wherein the catalyst has a deactivation rate of less than about 2.4° F./day and a T$_{60}$ of about 875 to about 975° F.

67. The process of claim 8 wherein the catalyst has a deactivation rate of less than about 2.4° F./day and a T$_{60}$ of about 875 to about 975° F.

68. The process of claim 30 wherein the catalyst has a deactivation rate of less than about 2.4° F./day and a T$_{60}$ of about 875 to about 975° F.

69. The process of claim 49 wherein the catalyst has a deactivation rate of less than about 2.4° F./day and a $T_{60}$ of about 875 to about 975° F.

70. A method of making a catalyst composition, comprising:
impregnating a large pore zeolite support with a platinum precursor; at least one acid halide; and at least one organic ammonium hydroxide represented by the formula $N(R')_4OH$, where R' is a substituted or unsubstituted carbon chain molecule having 1–20 carbon atoms wherein each R' may be the same or different.

71. A method of making a catalyst composition, comprising:
impregnating a large pore zeolite support with a platinum precursor and at least one organic ammonium fluoride precursor represented by the formula $N(R)_4F$ and at least one organic ammonium chloride precursor represented by the formula $N(R)_4Cl$, where R is a substituted or unsubstituted carbon chain molecule having 1–20 carbon atoms wherein each R may be the same or different.

72. A composition made according to the method of claim 1.

73. A process for reforming a hydrocarbon comprising:
contacting hydrocarbons with a catalyst under suitable reaction conditions for aromatizing the hydrocarbons, wherein the catalyst is farmed by a process comprising impregnating a large pore zeolite support with a platinum precursor and at least one organic ammonium fluoride precursor represented by the formula $N(R)_4F$ and at least one organic ammonium chloride precursor represented by the formula $N(R)_4Cl$, where R is a substituted or unsubstituted carbon chain having 1–20 carbon atoms and each R may be the same or different.

74. The process of claim 73 wherein the catalyst has a deactivation rate of less than about 2.4° F./day and a $T_{60}$ of about 875 to about 975° F.

75. The process of claim 73 further comprising recovering hydrogen.

76. The process of claim 70 further comprising vacuum drying the impregnated catalyst support.

77. The process of claim 71 further comprising vacuum drying the impregnated catalyst support.

78. The process of claim 70 further comprising calcining the impregnated catalyst support in air having a diluted oxygen content.

79. The process of claim 71 further comprising calcining the impregnated catalyst support in air having a diluted oxygen content.

80. The process of claim 76 further comprising calcining the impregnated catalyst support in air having a diluted oxygen content.

81. The process of claim 77 further comprising calcining the impregnated catalyst support in air having a diluted oxygen content.

* * * * *